Dec. 25, 1928.
B. PRATT
ANGLE COCK
Filed Sept. 21, 1925
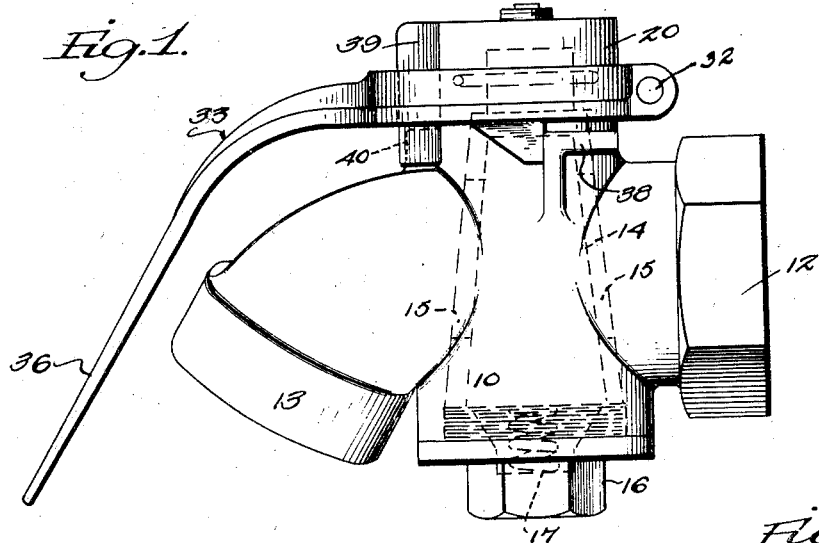
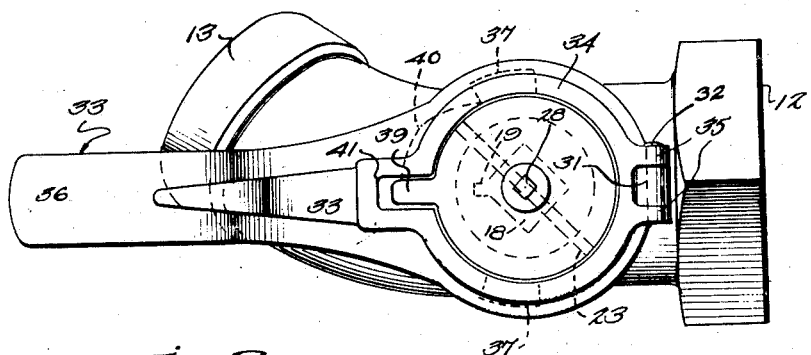
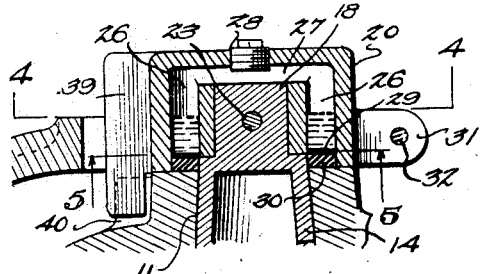
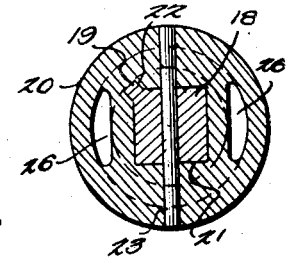
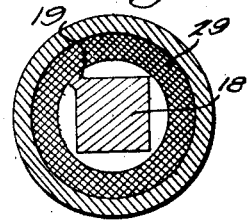
Inventor
BEST PRATT
By
C. M. Farben
Attorney Patented Dec. 25, 1928.

1,696,283

UNITED STATES PATENT OFFICE.

BEST PRATT, OF CHICAGO, ILLINOIS.

ANGLE COCK.

Application filed September 21, 1925. Serial No. 57,763.

This invention relates to angle cocks and more particularly to such a device adapted for use in connection with the air brake pipe lines of railroad trains.

An important object of the invention is to provide a valve body having a tapered valve therein, means being provided for effectively lubricating the valve to render its operation easier and to prolong the life of the valve.

A further object is to provide an angle cock having a locking operating handle and a cap arranged over the valve body and covering the valve, the cap referred to projecting upwardly above the handle to provide protection for the handle and for the valve when a workman stands on the valve as is frequently done.

A still further object is to provide an angle cock having a cap as above described provided with means for supplying a lubricant to the valve and protecting the valve against the entrance of dirt or other foreign matter.

Other objects and advantages of the invention will become apparent during the course of the following description.

In the drawings I have shown one embodiment of the invention. In this showing:

Figure 1 is a side elevation of the valve,

Figure 2 is a plan view,

Figure 3 is a central vertical sectional view of the upper end of the valve,

Figure 4 is a section on line 4—4 of Figure 3,

Figure 5 is a similar view on line 5—5 of Figure 3, and,

Figure 6 is an under side perspective of the valve cap.

Referring to the drawings, the numeral 10 designates a valve body having a tapered opening 11 therein. The valve body is provided with the usual conduits 12 and 13 adapted for connection with the usual train pipes. It is the usual practice to arrange the conduit 13 with its axis in the same plane as the axis of the conduit 12 in which case it is necessary to tilt the valve substantially at an angle of sixty degrees whereby proper connection can be made between the conduit 13 and an air hose leading to the next car. This necessitates the operation of the handle in a plane at an angle to the horizontal and to overcome this I arrange the conduit 13 as shown in Figures 1 and 2 whereby it curves downwardly and inwardly with respect to the valve body. This arrangement of the conduit 13 permits the valve body to be mounted vertically whereby the handle may be rotated in a horizontal plane as will be described.

A preferably hollow tapered valve 14 is arranged in the tapered opening of the valve body and is rotatable therein. The valve is provided with the usual openings 15 adapted to register with the conduits 12 and 13 to permit the passage of air therethrough, as will be understood. A threaded block 16 is arranged in the lower end of the valve body and a spring 17 is arranged between the valve and block to retain the valve in proper seated position. As shown in Figures 4 and 5, the valve is provided with a preferably square integral shank 18 at its upper end and this shank is provided with a preferably integral key 19 for a purpose to be described.

A substantially cylindrical cap 20 is arranged over the upper end of the valve body and is provided with a substantially square axial opening 21 to receive the shank 18 and is further provided with a key-way 22 receiving the key 19. A pin 23 passes through the cap 20 and shank 18 to secure these elements together, as will be obvious. The cap is provided in its lower end with a circular recess 24 and the flange 25 formed outwardly of the recess is adapted to bear directly against the upper end of the valve body, as clearly shown in Figure 3. On opposite sides of the pin 23 the cap 20 is provided with vertical passages 26 which communicate at their lower ends with the recess 24 while the upper ends of these passages communicate through a transverse passage 27, as shown in Figure 3. A plug 28 is provided in the upper end of the cap to permit the introduction of lubricant into the passages 26 and 27, as will be apparent. A screen 29 is arranged in the recess 24 and a felt or similar washer is arranged between the screen and upper end of the valve body, as shown in Figure 3.

The cap 20 is provided at one side with an integral ear 31 having a pivot pin 32 arranged therethrough. A handle 33 is adapted to operate the valve, and this handle is provided with a cylindrical portion 34 surrounding the cap 20 at a point spaced from its upper end, as shown. The cylindrical or circular portion of the handle is provided with ears 35 arranged on opposite sides of the ear 31 and the pivot pin 32 passes through the ears 35 to pivotally connect the handle to the cap. The handle 33 is provided at the opposite side with an operating portion 36 which is arranged substantially in the same vertical plane as the conduit 12 when the valve is in the position shown.

The circular portion of the handle is provided on opposite sides with depending lugs 37 and one of the lugs 37 is adapted to engage a cooperating lug 38 preferably cast integral with the valve body. The cap 20 is provided opposite the ears 35 with a vertical rib 39, as shown in Figures 1 and 2. This rib is adapted to engage against a lug 40 cast integral with the valve body to prevent rotation of the cap in one direction, as will be obvious. The handle 33 is provided with a slot 41 to receive the rib 39, as shown in Figure 2.

The operation of the device is as follows:
When the handle 33 is in the position shown in Figures 1 and 2, the valve is open and air is adapted to flow through the valve in the usual manner. When it is desired to close the valve, the handle 33 may be lifted releasing the lug 37 from the lug 38 whereupon the handle and cap may be rotated in a counterclockwise direction as viewed in Figure 2. When the valve is rotated through approximately a quarter circle, the rib 39 will contact with the lug 38 and limit further movement. The handle then may be lowered and the other lug 37 will engage the lug 40 to prevent rotation of the valve in a clockwise direction. It will be obvious that the valve again may be opened by lifting the handle and reversing the rotation of the valve until the rib 39 contacts with the lug 40.

In the manufacture of the device the adjacent faces of the cap and valve body are preferably machined to form a tight joint. Lubricant will be supplied through the passages 26 and 27 to maintain the washer 30 in a saturated condition whereby lubricant will be supplied to the valve to properly lubricate it. At the same time the provision of the ring or washer 30 prevents the entrance of dust into the valve between the cap 20 and the valve body. It will be noted that the cap 20 extends upwardly a substantial distance above the handle and the lower end of the cap bears directly against the valve body. When weight is applied to the upper end of the device as, for instance, when a workman stands upon the valve, it will be apparent that the weight will be taken up by the valve body. Thus the valve and handle will not be subject to injury.

The arrangement of the conduit 13 at an angle to a vertical plane through the valve body permits the latter to be mounted vertically in order that the proper piping connections can be made and eliminates the necessity of mounting the valve body itself at an angle. Thus the handle may be operated by rotating it in a horizontal plane.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a valve body, a valve rotatably mounted in said body, a rotatable cap connected to said valve, said cap being substantially equal in size to the upper end of and resting upon said valve body to be supported thereby, a handle having a portion surrounding said cap and pivotally connected thereto at one side thereof to swing in a vertical plane, means for locking said handle against horizontal movement when in its lower position, said handle being adapted to be raised to release said locking means to permit rotation of said cap, said cap extending upwardly from said valve body a greater distance than said handle when the latter is in lower position.

2. A device of the character described comprising a valve body, a valve rotatably mounted in said body and having a portion extending through the upper end thereof, a cap connected to said valve to actuate it, said cap being provided at its lower end with a depending annular flange resting upon the upper end of said valve body to be supported thereby, said cap being provided within said flange with a lubricant containing recess, and a handle connected to said cap.

3. A device constructed in accordance with claim 2 wherein a portion of said lubricant containing recess is arranged at the bottom of said cap and is circular in shape, and a porous washer arranged in the circular portion of said recess.

4. A device of the character described comprising a valve body, a valve rotatably mounted in said body and having a portion extending through the upper end thereof, a rotatable cap connected to said valve, said cap being provided at its lower end with a depending annular flange resting upon the upper end of said valve body to be supported thereby, said cap being provided in its lower end within said flange with a recess, a porous washer arranged in said recess and contacting with the upper end of said valve body, said cap being further provided with upwardly extending passages communicating with said recess, means wherethrough lubricant is supplied to said passages, and a handle connected to said cap.

In testimony whereof I affix my signature.

BEST PRATT.